United States Patent
Collings

(10) Patent No.: US 6,908,559 B2
(45) Date of Patent: Jun. 21, 2005

(54) PROCESS FOR TREATING A SOLID-LIQUID MIXTURE

(75) Inventor: Anthony Francis Collings, Turramurra (AU)

(73) Assignee: Commonwealth Scientific and Industrial Research Organisation, Campbell (AU)

(*) Notice: Subject to any disclaimer, the term of this patent is extended or adjusted under 35 U.S.C. 154(b) by 0 days.

(21) Appl. No.: 10/380,402

(22) PCT Filed: Sep. 13, 2001

(86) PCT No.: PCT/AU01/01164

§ 371 (c)(1),
(2), (4) Date: Apr. 22, 2003

(87) PCT Pub. No.: WO02/22252

PCT Pub. Date: Mar. 21, 2002

(65) Prior Publication Data

US 2003/0168412 A1 Sep. 11, 2003

(30) Foreign Application Priority Data

Sep. 13, 2000 (AU) .............................................. PR4871

(51) Int. Cl.⁷ ............................. B01J 19/10; C02F 1/36
(52) U.S. Cl. ...................... 210/668; 210/748; 210/763; 210/909; 204/158.2; 405/128.1; 588/304
(58) Field of Search ................................ 210/660, 663, 210/668, 748, 763, 766, 909; 204/157.15, 158.2; 405/128.1, 128.85; 588/304, 406

(56) References Cited

U.S. PATENT DOCUMENTS

| 4,401,131 A | | 8/1983 | Lawson | |
| 4,477,357 A | * | 10/1984 | Sittenfield | 210/748 |
| 5,053,141 A | | 10/1991 | Laiho | |
| 5,130,032 A | * | 7/1992 | Sartori | 210/748 |
| 5,198,122 A | * | 3/1993 | Koszalka et al. | 210/748 |
| 5,242,601 A | * | 9/1993 | Manchak et al. | 210/711 |
| 5,498,431 A | * | 3/1996 | Lindner | 426/238 |
| 5,984,578 A | * | 11/1999 | Hanesian et al. | 405/128.2 |
| 6,077,431 A | * | 6/2000 | Kawanishi et al. | 210/609 |
| 6,117,334 A | | 9/2000 | Coury et al. | |

FOREIGN PATENT DOCUMENTS

| DE | 821341 | | 11/1951 |
| DE | 943768 | | 6/1956 |
| EP | 0529845 | | 3/1993 |
| JP | 59147689 | | 8/1984 |
| WO | WO 9207797 | | 5/1992 |
| WO | WO 96/20784 | * | 7/1996 |
| WO | WO 0017109 | | 3/2000 |

* cited by examiner

Primary Examiner—Frank M. Lawrence
(74) Attorney, Agent, or Firm—Ladas & Parry LLP

(57) ABSTRACT

A process for treating a solid-liquid mixture by cavitation to decompose at least some contaminant associated with the solid particles, the contaminant either being absorbed into the pores of the solid or onto the surface of the solid particles. The process includes the step of subjecting the mixture to cavitation such that a portion of the contaminant is chemically decomposed. Typically the chemical decomposition occurs at the surface of the solid particle. Typically the cavitation process is an ultrasonic treatment step, although other cavitation processes are applicable, for example high shear mixing. The cavitation effect is capable of achieving physico-chemical changes at the particle surfaces. The localized high temperatures on bubble collapse (as high as 5000K) can decompose contaminant substances such as PCB and other hazardous materials including polybrominated biphenyl PBB), organochloride and organophosphate compounds, pesticides and the like.

16 Claims, 6 Drawing Sheets

PROCESS FOR TREATING A SOLID-LIQUID MIXTURE

FIELD OF THE INVENTION

The present invention relates to a process for the decomposition of contaminant substances. The method can be applied to decontaminate soils and other substrates containing polychlorinated biphenyl (PCB) compounds in domestic, municipal or industrial applications and will primarily be described with reference to this context. It should be remembered, however, that the invention has broader use in the decomposition of all manner of hazardous materials including polybrominated biphenyl (PBB), organochlorides and organophosphate compounds, pesticides and the like.

BACKGROUND ART

Polychlorinated biphenyls (PCB compounds) were first discovered to be environmental pollutants in 1966. They have been round throughout the world in water, solid sediments, and bird and fish tissue. There are some 209 different PCB compounds available, made by substituting from 1 to 10 chlorine atoms onto a biphenyl aromatic structure. PCB compounds have very high chemical, thermal and biological stability, and a low, water solubility and vapour pressure. While these useful properties contributed to their widespread use, those same properties allowed these compounds to be accumulated in the environment.

The manufacture of PCB compounds was discontinued in the United States in 1979, although these compounds continue to enter the environment from discarded electrical equipment, etc. PCB concentrations of 1–2 ppm are normally the desired maxima, and levels of 10–50 ppm in agricultural soils, clays or marine sediments are considered hazardous. The dense and hydrophobic nature of PCB compounds ensures that their accumulation in river sediment is commonplace, leading to bioaccumulation in bottom dwellers and fish thus leading to entry into the human food chain. PCB compounds can reduce human disease resistance, and increase the incidence of rashes, liver ailments and headaches. Similarly, pesticides can have serious health effects on humans and animals.

Numerous investigations of ways to degrade PCB compounds and pesticides have been carried out. At present there are no widely accepted methods for the large scale remediation of water or soils contaminated with PCB compounds or pesticides. The decomposition of PCB and organochloride compounds can be effected by high temperature incineration at a typical temperature of 1300° C. but the gaseous products must be quenched quickly to avoid the reformation of the PCB or the formation of undesirable side reaction products such as dioxins at 800 –900° C. Such a process is complicated and with variable or uncertain outcomes. Biodegradation with microorganisms and chemical treatment are methods which require lengthy treatment periods. Photocatalytic (UV) degration of contaminated soil-water systems has also been tried but is also slow.

Ultrasound is known in the art for inducing chemical reaction processes in liquids, a field known as sonochemistry. The propagation of ultrasonic waves in a liquid generates cavitation bubbles. These bubbles implode and produce micro-regions of extreme conditions. Estimated temperatures within these micro-regions range from 2000–5000K in aqueous solution. In U.S. Pat. No. 5,498,431 a process is described for decontaminating particulate surfaces by the use of ultrasound to firstly release mycotoxins from the particulates into an aqueous liquid followed by a chemical reaction breakdown of the contaminants by ultrasound when in the liquid. The cavitation from the ultrasound leads to a sonochemical breakdown reaction of the mycotoxin contaminants when in the aqueous liquid. In WO96/20784 a method of chemical reaction catalysis in a liquid is described which is facilitated by ultrasonic cavitation. The cavitation is aided by the presence of solid particles as a surface for 'seeding' the cavitation bubbles prior to their separation from the solid particles whereupon the bubbles cavitate (implode) in the liquid medium.

Ultrasound has been used to decompose PCB compounds that are dissolved in an aqueous solution. However, because of their low solubility, the concentration of PCB compounds in aqueous solution is very low when compared with that found adsorbed onto solids, river sediment and the like, so that such an aqueous treatment technique is largely ineffective.

It is to be understood that, if any prior art publication is referred to herein, such reference does not constitute an admission that the publication forms a part of the common general knowledge in the art, in Australia or any other country.

SUMMARY OF THE INVENTION

In a first aspect the present invention provides a process for treating a mixture of a solid and a liquid to decompose a contaminant associated with the solid, said process including the step of subjecting the mixture to cavitation wherein at least a portion of the contaminant is chemically decomposed, the chemical decomposition occurring at or near a surface of the solid.

Such a process can provide an improved technique for the decomposition of contaminant substances by providing for localised high temperatures followed immediately by a quenching of the decomposition products (ie. by the liquid) thereby avoiding the reformation of the substance or the formation of undesirable side reaction products at certain temperatures. The technique can effectively treat contaminated solid particles at their surface where the concentration of contaminants is at its highest when compared with the aqueous phase.

In the prior art processes for the chemical decomposition of a contaminant by the use of cavitation, a physical separation of the contaminant from a substrate material into a liquid occurs so that sonochemical reactions can occur in the liquid. In the present process a physical separation of a contaminant from a substrate into a surrounding liquid is not required and the contaminant is present at or near the surface of the solid. U.S. Pat. No. 5,498,431 and WO96/20784 disclose only that chemical decomposition occurs in the surrounding liquid.

Preferably the cavitation process is effected by an ultrasonic treatment process using ultrasonic source equipment such as ultrasonic plates, probes, baths or other chambers.

Preferably the process also includes the step of mixing the solid and liquid whereby the solid is substantially suspended in the liquid to increase exposure of the mixture to cavitation.

Preferably the solid includes mineral and/or organic matter. Most preferably the solid includes one or more materials such as silica, clay, carbonaceous material, activated carbon or calcium carbonate.

In a second aspect the present invention provides a process for treating a mixture of a solid and a liquid to decompose a contaminant associated with the solid, said process including the step of subjecting the mixture to cavitation wherein at least a portion of the contaminant is chemically decomposed and wherein at least some of the solid serves to catalyse the decomposition.

Preferably in this second aspect the chemical decomposition occurs at or near a surface of the solid.

Preferably the other process steps of the second aspect are as defined in the first aspect.

In a third aspect the present invention provides a process for treating and decomposing a contaminant in a liquid which includes the contaminant, the process including the steps of:

adsorbing the contaminant on a solid; and subjecting a mixture of at least some of the solid and at least some of the liquid to cavitation such that at least a portion of the contaminant associated with the solid is chemically decomposed at or near a surface of the solid.

Preferably the process steps of the third aspect are as defined in the first aspect.

BRIEF DESCRIPTION OF THE DRAWINGS

Notwithstanding any other forms which may fall within the scope of the present invention, a preferred form of the invention will now be described, by way of example only, with reference to the accompanying drawings in which.

MODES FOR CARRYING OUT THE INVENTION

Figure 1:
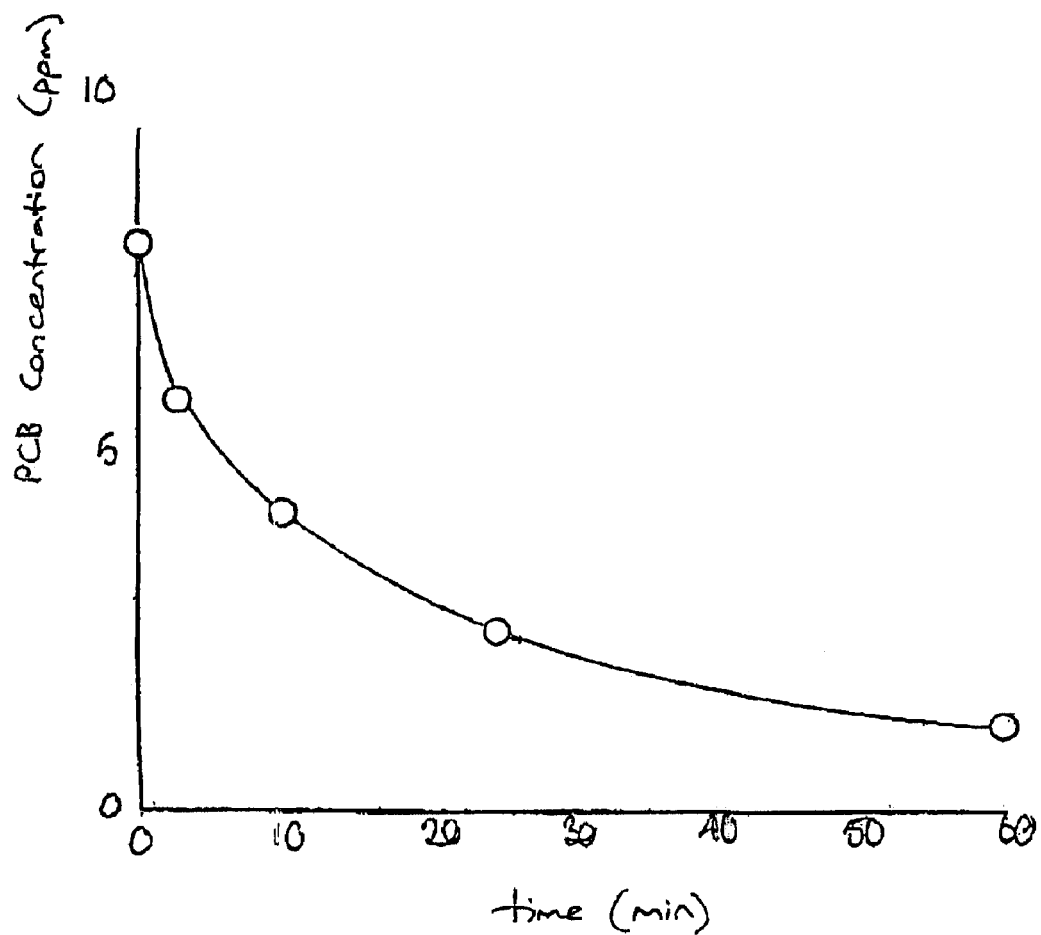
FIG. 1 shows some experimental results for the decomposition of a PCB located on a silica particulate substrate as a function of time; following the treatment of aqueous particulate suspensions in accordance with an embodiment of the invention.

A process for treating a solid-liquid mixture by cavitation has been developed to decompose at least some contaminant associated with the solid particles, the contaminant either being adsorbed into the pores of the solid or onto the surface of the solid particles.

The process includes the step of subjecting the mixture to cavitation such that a portion of the contaminant is chemically decomposed. Typically the chemical decomposition occurs at the surface of the solid particles, although the process can also occur to some extent within the pores near the surface of the solid material being treated. In the preferred embodiment the cavitation process is an ultrasonic treatment, step, although other cavitation processes are applicable, for example high shear mixing.

Under the influence of ultrasound, the formation of a vapour bubble (as distinct from one formed from dissolved gases) occurs when stress in the liquid (due to the negative pressure produced during the expansion cycle of a sound wave) exceeds the tensile strength of the liquid. The stress at a solid-liquid boundary, due to the presence of an ultrasonic field, is much greater than in the bulk of a liquid. The likelihood of a vapour bubble forming at the solid-liquid boundary is around twice that in the body of liquid. This applies to both solid particle suspensions as well as to the walls of a vessel. The smaller particles are more likely to support vapour bubble nuclei because of their high surface area and surface free energy.

Large amounts of energy are released from the cavitation collapse of vapour bubbles at or near the surface of the solids. The manner of the collapse near a surface takes the form of a high velocity jet directed at that surface. This effect is capable of achieving physico-chemical changes at the particle surfaces.

The inventor has surprisingly discovered that the localised high temperatures on bubble collapse (as high as 5000K) can decompose contaminant substances such as PCB and other hazardous materials including polybrominated biphenyls (PBB), organochloride and organophosphate compounds, pesticides and the like. One of the advantages of the treatment process is that the decomposition products are quenched quickly to the temperature of the bulk fluid (at, for example, 50° C.) which avoids the reformation of the PCB or the formation of undesirable side reaction products such as dioxins.

In the preferred embodiment the solid-liquid mixture being treated by such a process can also be mixed by means of an impeller or similar stirring device in a mixing vessel to cause the solid-liquid mixture to become substantially suspended. This can maximise the exposure of the particle surfaces in the mixture to cavitation. It is also possible that the mixture can be stirred simultaneously with insonation or as separate steps.

Typically the solid particles are mineral and/or organic matter for example silica (sand), calcium carbonate, carbonaceous matter including activated carbon, clay or soils and sediments containing organics and/or mixtures thereof.

The role of the solid substrate can also be to catalyse the decomposition depending upon the material chosen. The substrate can in fact catalyse the rate and the extent of the decomposition reaction. Such substrate materials may include titanium dioxide, for example (a known photocatalytic material).

The porosity of the substrate can also influence the quantity of PCB available for surface or near surface reaction. Very adsorptive or porous substrates such as activated carbon or charcoal can adsorb a large quantity of a contaminant substance and make this material available at the surface for reaction.

The source of the ultrasound can be any suitable device which can be used to deliver sound waves of sufficient power and intensity, typically an ultrasonic bath, plate or probe source.

In use the process can provide an improved technique for the decomposition of PCB and other hazardous substances by providing a localised high temperatures followed immediately by a quenching of the decomposition products thereby avoiding the reformation of the substance or the formation of undesirable side reaction products. The technique can effectively treat contaminated solid particles by a surface reaction which is where the concentration of contaminants is highest when compared with the aqueous phase.

The process can also be applied to situations where a contaminated liquid flow requires effective treatment. Normally the use of ultrasound to treat low levels of PCB or pesticides etc when dissolved in a liquid stream is an ineffective process. Large volumes of fluid having a low concentration of contaminant are not able to be efficiently processed. As an alternative, the PCB or other contaminant can be adsorbed onto a solid substrate and the substrate then subjected to a cavitation step to effect the chemical decomposition of the much more concentrated contaminant. If a high surface area reusable material such as activated carbon or clay solids was used, the process can be repeatedly applied to a liquid stream using the same recycled solid materials.

Whilst the invention has been described with reference to a number of preferred embodiments it should be appreciated that the invention can be embodied in many other forms.

EXPERIMENTAL EXAMPLES

The following experimental, examples show the reduction of adsorbed PCB concentrations on solid particles following ultrasonic treatment in an aqueous pulp.

Calcium carbonate and silica (sand) solids were mixed separately with a PCB compound which had been separately dissolved in acetone to form a solution. The PCB compound selected was available under the trade name ARACLOR 1260. The mixture was then evaporated to dryness and the PCB then became surface adsorbed onto the solids. A 100 g quantity of these solids and an equivalent weight of water were then agitated to produce an aqueous slurry batches of which were experimentally subjected to ultrasound at a frequency of 20 kHz and a power input of 170 W. The residual PCB remaining on the solids as a function of time was measured by gas chromatography.

FIG. 1 depicts the reduction in measured PCB on silica solids following extended periods of sonication up to 60 minutes. The initial concentration of PCB was around 8 ppm and was reduced to around 2 ppm after 60 minutes, representing around 75% decomposition.

Figure 2:
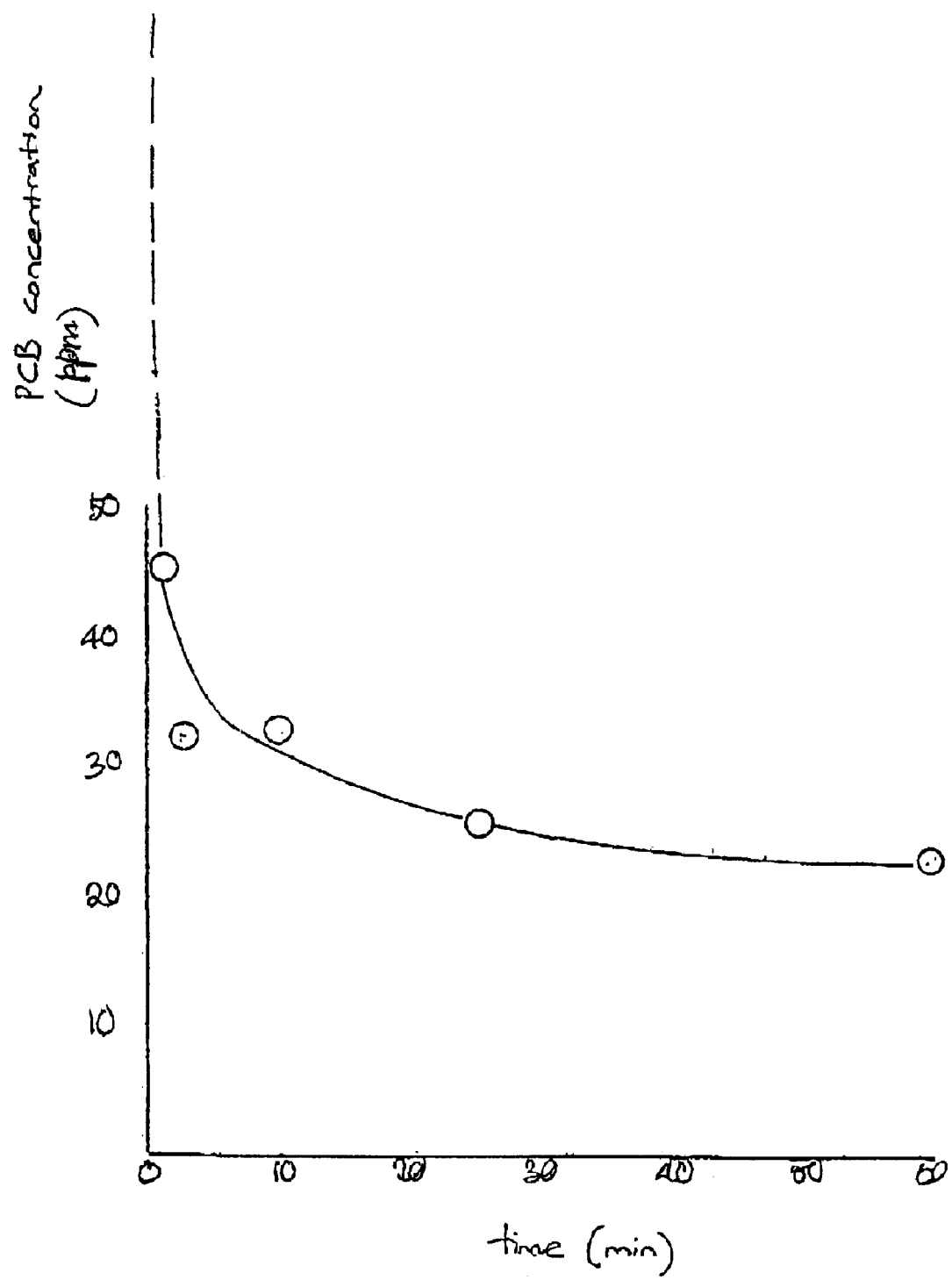
FIG. 2 shows some other experimental results for the decomposition of a PCB at a higher initial concentration located on a silica particulate substrate as a function of time; following the treatment of aqueous particulate suspensions in accordance with an embodiment of the invention.

FIG. 2 depicts the reduction in measured PCB on silica solids following extended periods of sonication up to 60 minutes. The initial concentration of PCB was above 50 ppm, and was reduced to around 24 ppm after 60 minutes representing more than 50% decomposition.

Figure 3:
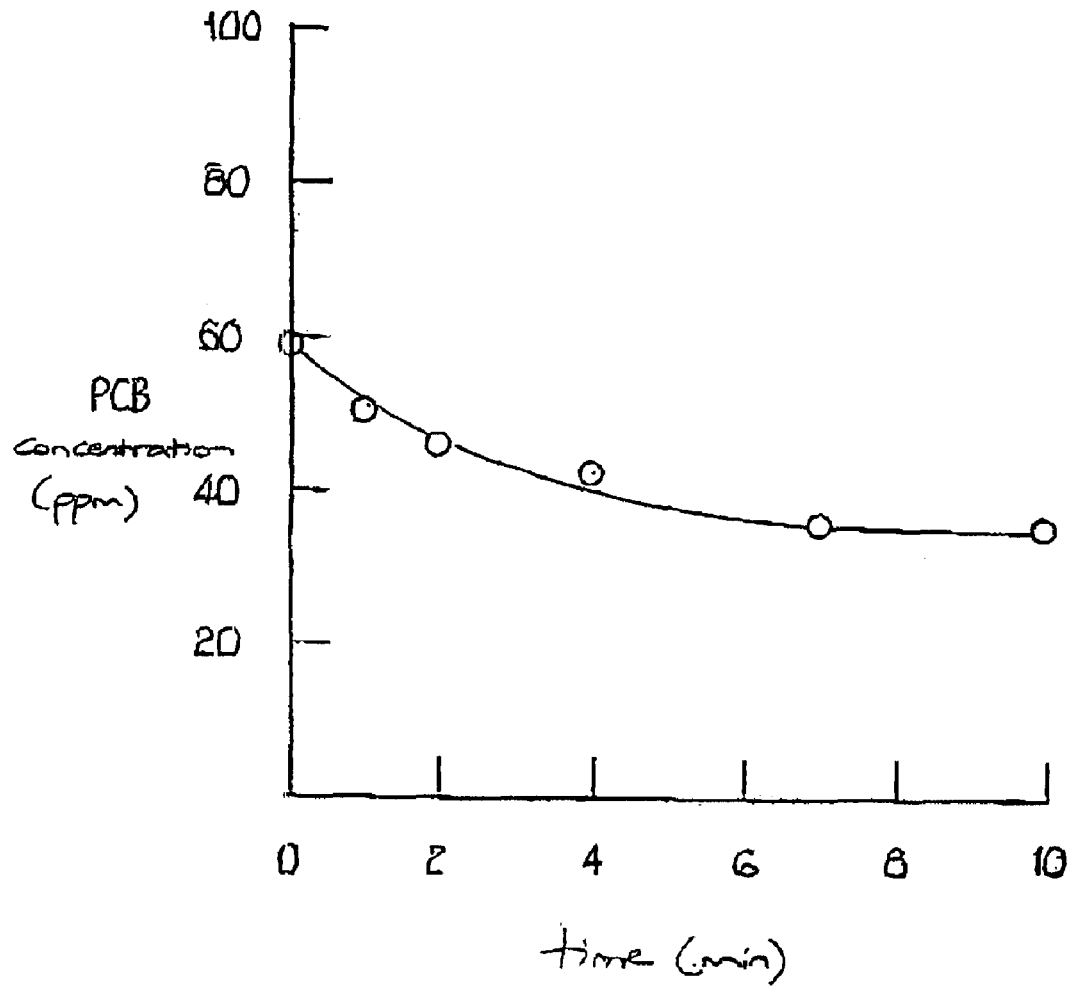
FIG. 3 shows some other experimental results for the decomposition of a PCB located on a silica particulate substrate as a function of time; following the treatment of aqueous particulate suspensions in accordance with an embodiment of the invention.

FIG. 3 depicts the reduction in measured PCB on silica solids following periods, of sonication up to 10 minutes. The initial concentration of PCB was around 60 ppm and was reduced to around 35 ppm after 10 minutes representing around 45% decomposition.

Figure 4:
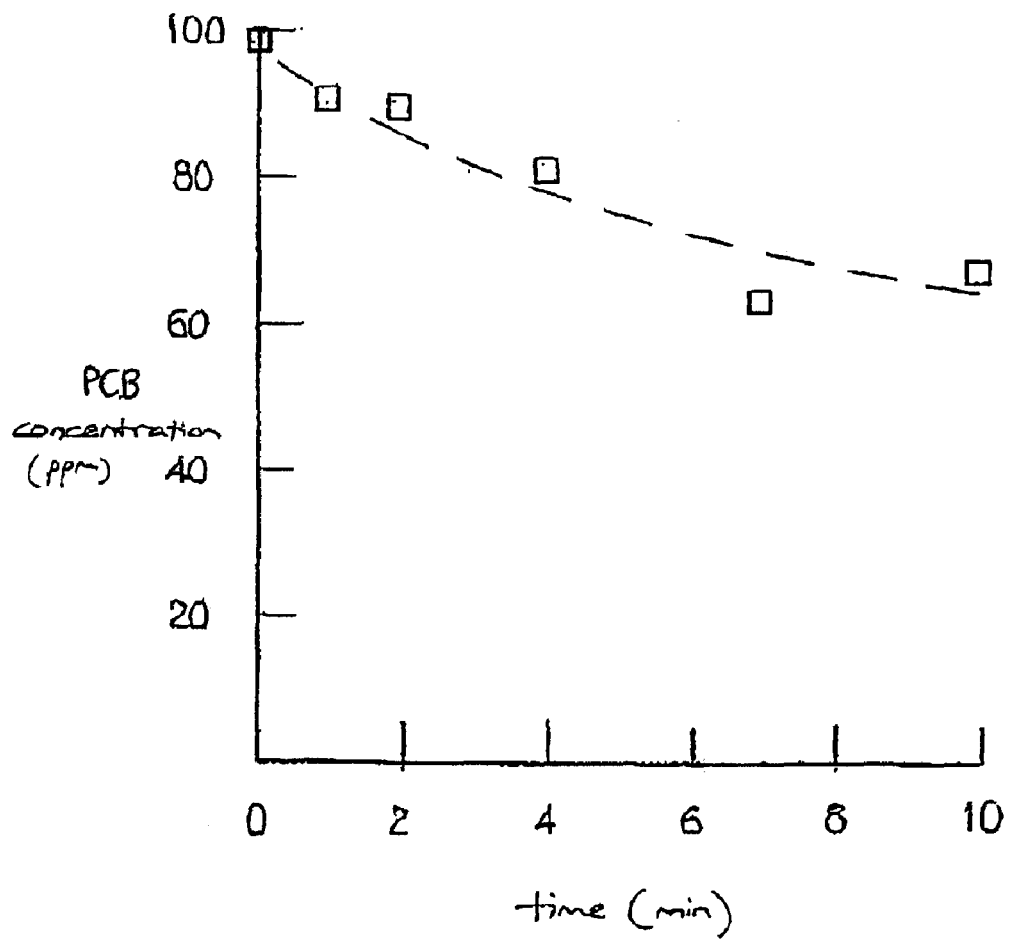
FIG. 4 shows some other experimental results for the decomposition of a PCB located on a calcium carbonate particulate substrate as a function of time; following the treatment of aqueous particulate suspensions in accordance with an embodiment of the invention.

FIG. 4 depicts the reduction in measured PCB on calcium carbonate solids following periods of sonication up to 10 minutes. The initial concentration of PCB was around 100 ppm and was reduced to around 65 ppm after 10 minutes representing around 35% decomposition.

The following experimental example shows the reduction of adsorbed DDT and chlordane concentrations on solid particles following ultrasonic treatment in an aqueous pulp.

Silica (sand) solids were mixed separately with DDT and chlordane which had been separately dissolved in acetone to form a solution. Each mixture was then evaporated to dryness, the respective pesticides then being surface adsorbed onto the solids. A 100 g quantity of these solids and an equivalent weight of water were then agitated to produce an aqueous slurry batches of which were experimentally subjected to ultrasound at a frequency of 20 kHz and a power input of 170 W. The residual DDT and chlordane remaining on the solids as a function of time was measured by gas chromatography.

Figure 5:
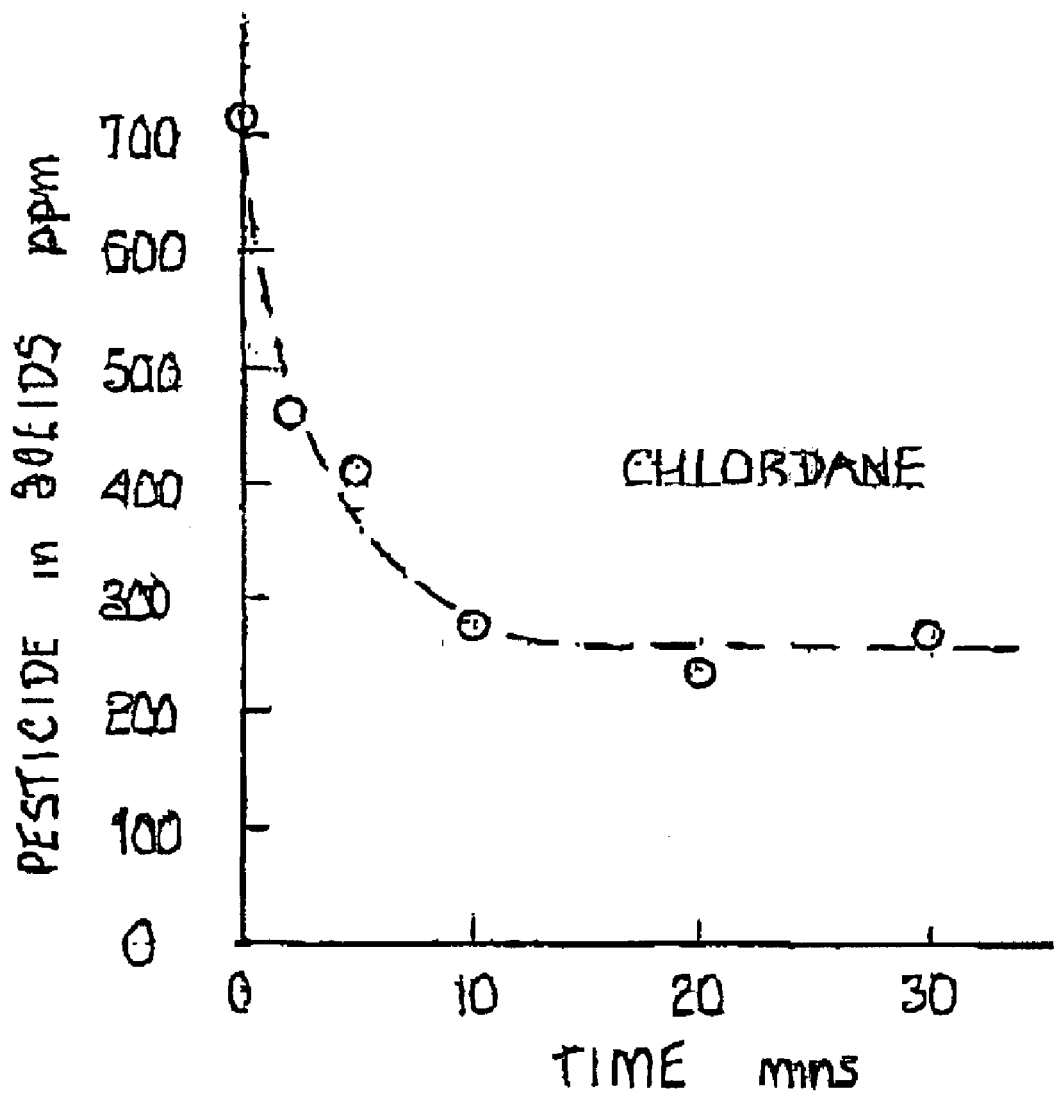
FIG. 5 shows some experimental results for the decomposition of a pesticide (Chlordane) located on a silica particulate substrate as a function of time; following the treatment of aqueous particulate suspensions in accordance with an embodiment of the invention.
Figure 6:
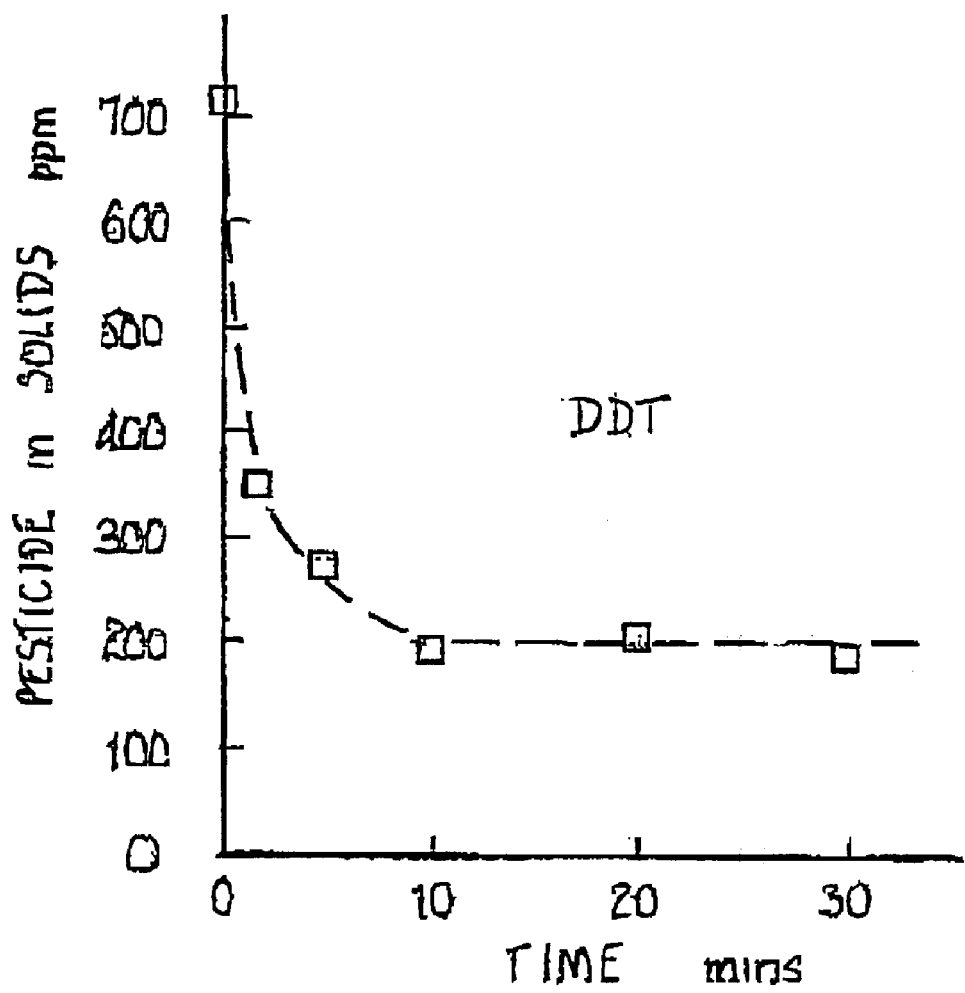
FIG. 6 shows some experimental results for the decomposition of a pesticide (DDT) located on a silica particulate substrate as a function of time; following the treatment of aqueous particulate suspensions in accordance with an embodiment of the invention.

FIG. 5 depicts the reduction in measured chlordane and FIG. 6 the reduction in measured DDT concentration on silica solids following extended periods of sonication up to 30 minutes. The initial concentration of DDT was around 715 ppm and was reduced to around 185 ppm after 30 minutes, representing around 74% decomposition. In the case of the chlordane, the initial concentration of chlordane was around 715 ppm and was reduced to around 270 ppm after 30 minutes, representing around 62% decomposition.

What is claimed is:

1. A process for treating a mixture of a solid and a liquid to decompose a contaminant associated with the solid, said process including the step of subjecting the mixture to cavitation wherein at least a portion of the contaminant is chemically decomposed, the chemical decomposition occurring at a surface of the solid.

2. A process for treating a mixture as claimed in claim 1 wherein the cavitation process is effected by an ultrasonic treatment process.

3. A process for treating a mixture as claimed in claim 1 further including the step of mixing the solid and liquid whereby the solid is substantially suspended in the liquid to increase exposure of the mixture to cavitation.

4. A process for treating a mixture as claimed in claim 1 wherein the solid includes mineral and/or organic matter.

5. A process for treating a mixture as claimed in claim 1 wherein the solid includes one or more materials from the group consisting of silica, clay, carbonaceous material, activated carbon and calcium carbonate.

6. A process for treating a mixture of a solid and a liquid to decompose a contaminant associated with the solid, said process including the step of subjecting the mixture to cavitation wherein at least a portion of the contaminant is chemically decomposed and wherein at least some of the solid serves to catalyse the decomposition.

7. A process as claimed in claim 6 wherein the chemical decomposition occurs at or near the surface of the solid.

8. A process as claimed in claim 6 wherein the cavitation process step is effected by an ultrasonic treatment process.

9. A process for treating and decomposing a contaminant in a liquid which includes the contaminant, the process including the steps of:
    adsorbing the contaminant on a solid;
    subjecting a mixture of at least some of the solid and at least some of the liquid to cavitation such that at least a portion of the contaminant associated with the solid is chemically decomposed at a surface of the solid.

10. A process as claimed in claim 9 wherein the cavitation process step is effected by an ultrasonic treatment process.

11. A process as claimed in claim 6 further including the step of mixing the solid and liquid whereby the solid is substantially suspended in the liquid to increase exposure of the mixture to cavitation.

12. A process as claimed in claim 6 wherein the solid includes mineral and/or organic matter.

13. A process as claimed in claim 6 wherein the solid includes one or more materials from the group consisting of silica, clay, carbonaceous material, activated carbon and calcium carbonate.

14. A process as claimed in claim 9 further including the step of mixing the solid and liquid whereby the solid is substantially suspended in the liquid to increase exposure of the mixture to cavitation.

15. A process as claimed in claim 9 wherein the solid includes mineral and/or organic matter.

16. A process as claimed in claim 9 wherein the solid includes one or more materials from the group consisting of silica, clay, carbonaceous material, activated carbon and calcium carbonate.

* * * * *